(12) United States Patent
Tsai et al.

(10) Patent No.: US 8,052,920 B2
(45) Date of Patent: Nov. 8, 2011

(54) APPARATUS FOR OBSERVING INTERIOR OF A BLAST FURNACE SYSTEM

(75) Inventors: Yung-Hsiang Tsai, Kaohsiung (TW);
Chung-Mei Chen, Kaohsiung (TW);
Shan-Wen Du, Kaohsiung (TW);
Jung-Ching Chen, Kaohsiung (TW);
Kai-Yuan Su, Kaohsiung (TW);
Ya-Ming Chiao, Kaohsiung (TW)

(73) Assignee: China Steel Corporation, Kaohsiung (TW)

( * ) Notice: Subject to any disclaimer, the term of this patent is extended or adjusted under 35 U.S.C. 154(b) by 267 days.

(21) Appl. No.: 12/387,068

(22) Filed: Apr. 28, 2009

(65) Prior Publication Data
US 2010/0270714 A1  Oct. 28, 2010

(51) Int. Cl.
*C21B 7/24* (2006.01)
(52) U.S. Cl. ............. 266/100; 266/78; 266/99; 266/199
(58) Field of Classification Search .................... 266/78, 266/99, 100, 199
See application file for complete search history.

(56) References Cited

U.S. PATENT DOCUMENTS

| 3,588,067 | A | * | 6/1971 | Shimotsuma et al. | .......... 266/90 |
| 4,322,627 | A | * | 3/1982 | Pirlet | ........................ 250/559.23 |
| 4,434,368 | A | * | 2/1984 | Liesch et al. | .................. 266/100 |
| 5,777,668 | A | * | 7/1998 | Amano | ........................... 348/83 |
| 2010/0270714 | A1 | * | 10/2010 | Tsai et al. | ..................... 266/100 |

* cited by examiner

*Primary Examiner* — Scott Kastler
(74) *Attorney, Agent, or Firm* — John A. Fortkort; Fortkort & Houston P.C.

(57) ABSTRACT

An apparatus for observing the interior of a blast furnace system includes a visible light guiding unit which defines a light path along a viewing axis that is radial to an upright axis of a furnace wall body of a blast furnace and which is adapted to be secured to a furnace blowpipe to permit the light path to be in visual communication with a tuyere, a beam splitter which is disposed in an accommodation space in the tubular mount to split a beam of light propagating along the light path into a horizontal component so that the operator can observe furnace condition through a peeping hole, and a vertical component, and a video camera system which includes an elongate casing connected to the tubular mount, and a video camera disposed in a cooling chamber of the casing to capture a light image from the vertical component of the light beam.

11 Claims, 3 Drawing Sheets

APPARATUS FOR OBSERVING INTERIOR OF A BLAST FURNACE SYSTEM

BACKGROUND OF THE INVENTION

1. Field of the Invention

This invention relates to an apparatus for observing the interior of a blast furnace system, more particularly to an apparatus which enables an operator to observe the interior of a blast furnace, and which has a video camera device for monitoring the conditions in the blast furnace.

2. Description of the Related Art

In making iron, iron ore, and cokes, together with flux are fed into a hot furnace, such as a blast furnace, and are ignited to produce molten hot metal and slag. In order to monitor the condition in the blast furnace, a peephole is disposed in the blast furnace and a filter is disposed over the peephole so that the operator can view the interior of the blast furnace through the peephole and detect any abnormal situations during operation of the furnace.

In order to detect and control the interior conditions of a blast furnace for long-term operation, a detecting system 2 as shown in FIG. 1 is proposed. The detecting system 2 includes a tubular mount 21 which is detachably mounted on a furnace wall 11 of a blast furnace and which is in visual communication with a peephole 12, a periscope 22 which is connected to and is communicated with the tubular mount 21 and which is substantially perpendicular to the tubular mount 21, a beam splitter 23 disposed at a juncture between the tubular mount 21 and the periscope 22, and a video camera 24 disposed within the tubular mount 21. Thus, the operator can sight the interior of the furnace using the periscope 22, and the interior condition of the furnace can be detected and recorded by the video camera 24.

However, the operator may hit against the tubular mount 21 when using the periscope 22, which may cause displacement of the video camera 24 relative to the peephole 12, thereby adversely affecting the detection of the furnace interior by the video camera 24. In addition, positioning of the video camera 24 within the tubular mount 21 is not stable, and displacement of the video camera 24 is likely to occur due to vibration of the furnace during operation.

SUMMARY OF THE INVENTION

An object of the present invention is to provide an apparatus for observing the interior of a blast furnace system which has a video camera system for monitoring the conditions in the blast furnace, and which enables an operator to observe the interior of the blast furnace without affecting operation of the video camera.

According to this invention, the apparatus for observing the interior of a blast furnace system includes a visible light guiding unit, a beam splitter, and a video camera system. The visible light guiding unit includes a tubular mount, a cantilevered stage, and front and rear walls. The tubular mount has furnace-side and viewing-side ends opposite to each other along a viewing axis that is radial to an upright axis of a furnace wall body of a blast furnace, and an inner tubular wall surface that defines a light path. The furnace-side end is secured to a furnace blowpipe of the blast furnace such that the light path is in visual communication with a tuyere. The cantilevered stage is disposed rearwardly of the viewing-side end below the light path. The front and rear walls extend uprightly from the cantilevered stage to respectively terminate at front and rear rest ends, and cooperatively define an accommodation space. The front and rear walls respectively have passage and peeping holes to permit the light path to extend across the accommodation space. The beam splitter is disposed in the accommodation space such that a beam of light propagating from the tuyere along the light path and incident on the beam splitter is split into a horizontal component passing through the peeping hole, and a vertical component directed to propagate along an upright light route. The video camera system includes an elongate casing and a video camera. The casing includes upper and lower end walls, and a barrel wall interposed therebetween and defining a cooling chamber. The lower end wall is engaged with the front and rear rest ends such that a centerline of the barrel wall is in line with the upright light route. The video camera includes a camera body disposed in the cooling chamber, and a head portion disposed forwardly of the camera body along the centerline so as to capture a light image from the vertical component of the light beam.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
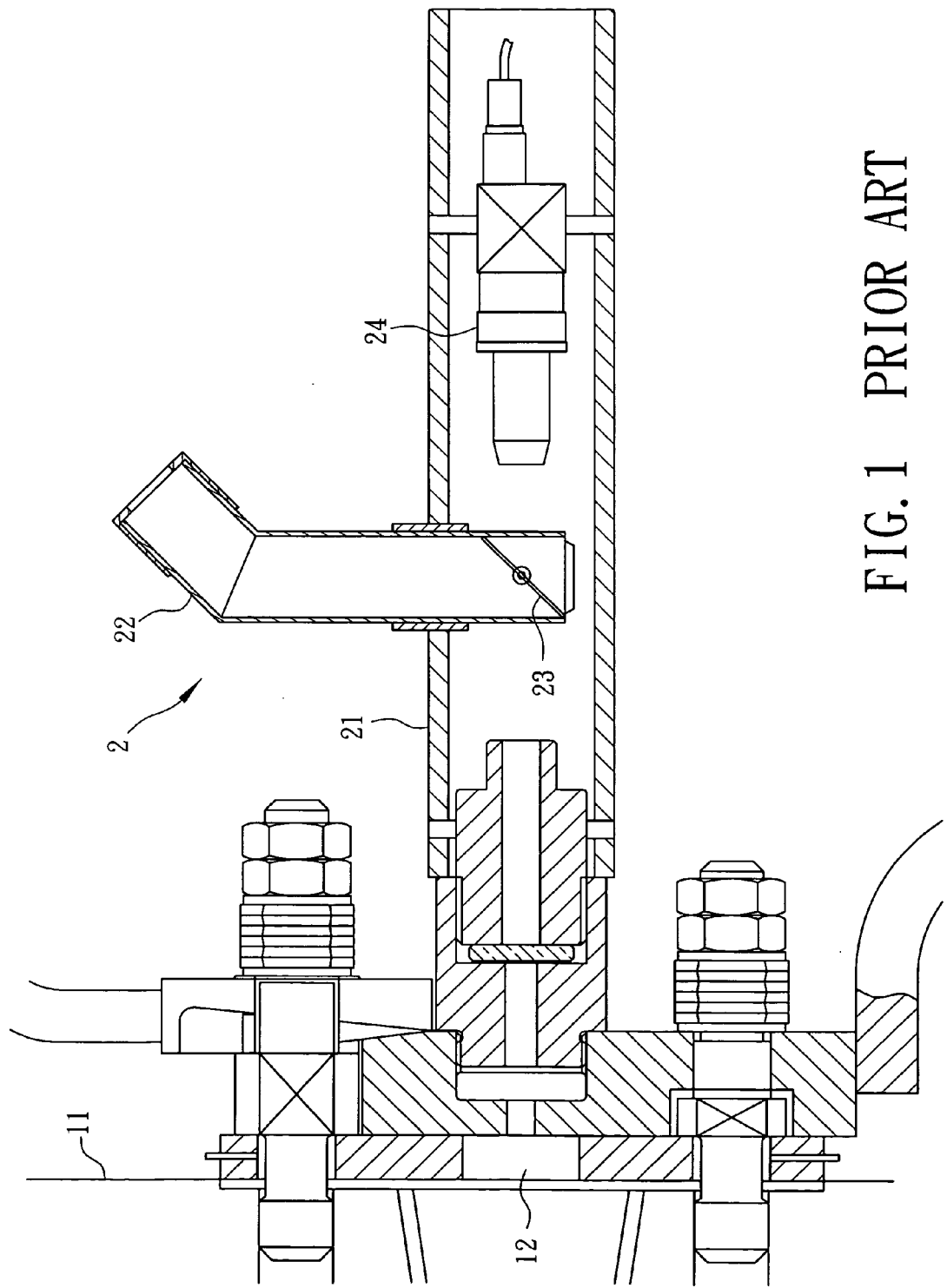
FIG. 1 is a sectional view of a conventional detecting system mounted on a blast furnace.
Figure 2:
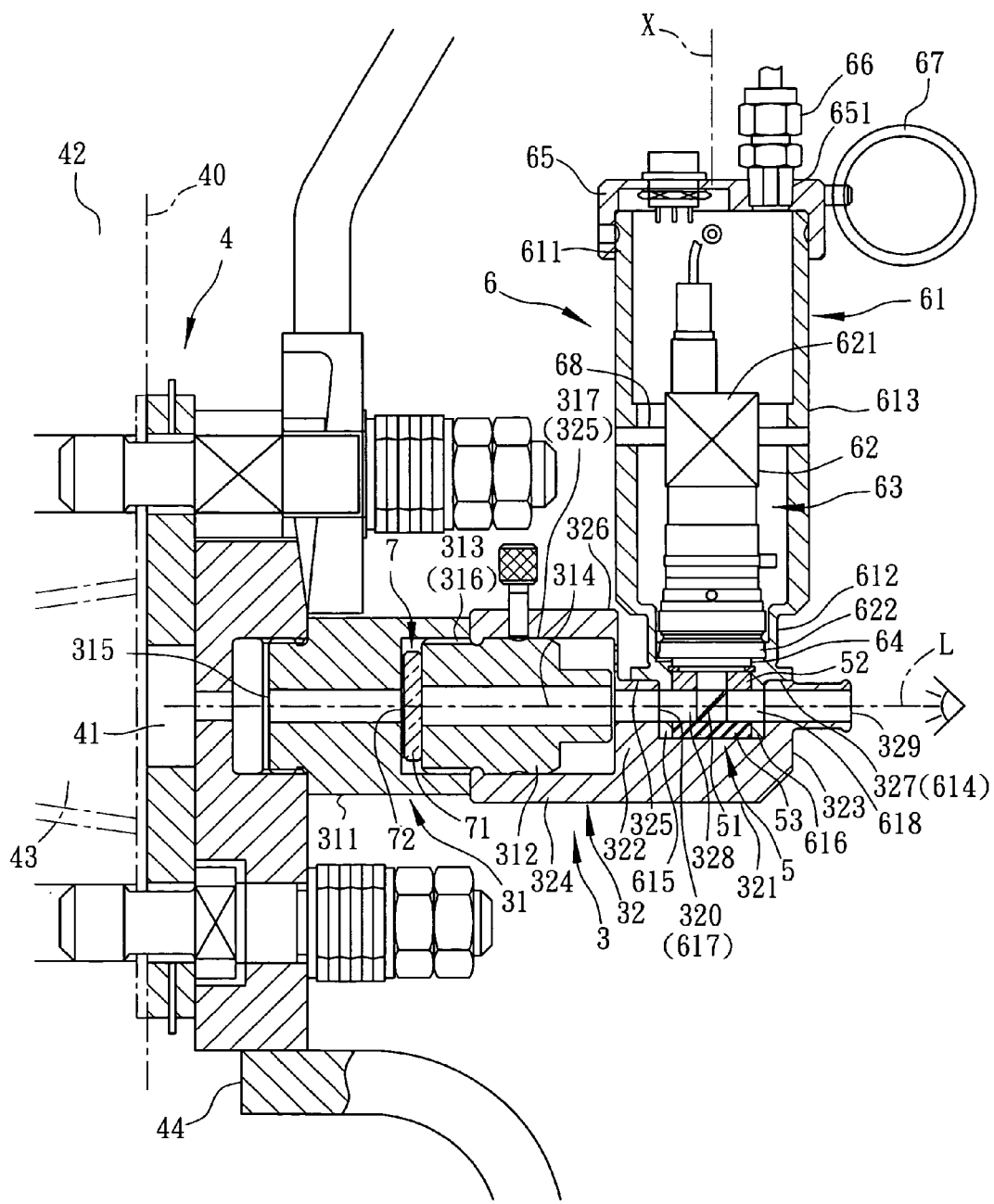
FIG. 2 is a sectional view of the preferred embodiment of an apparatus for observing the interior of a blast furnace according to this invention when mounted on a furnace wall body.
Figure 3:
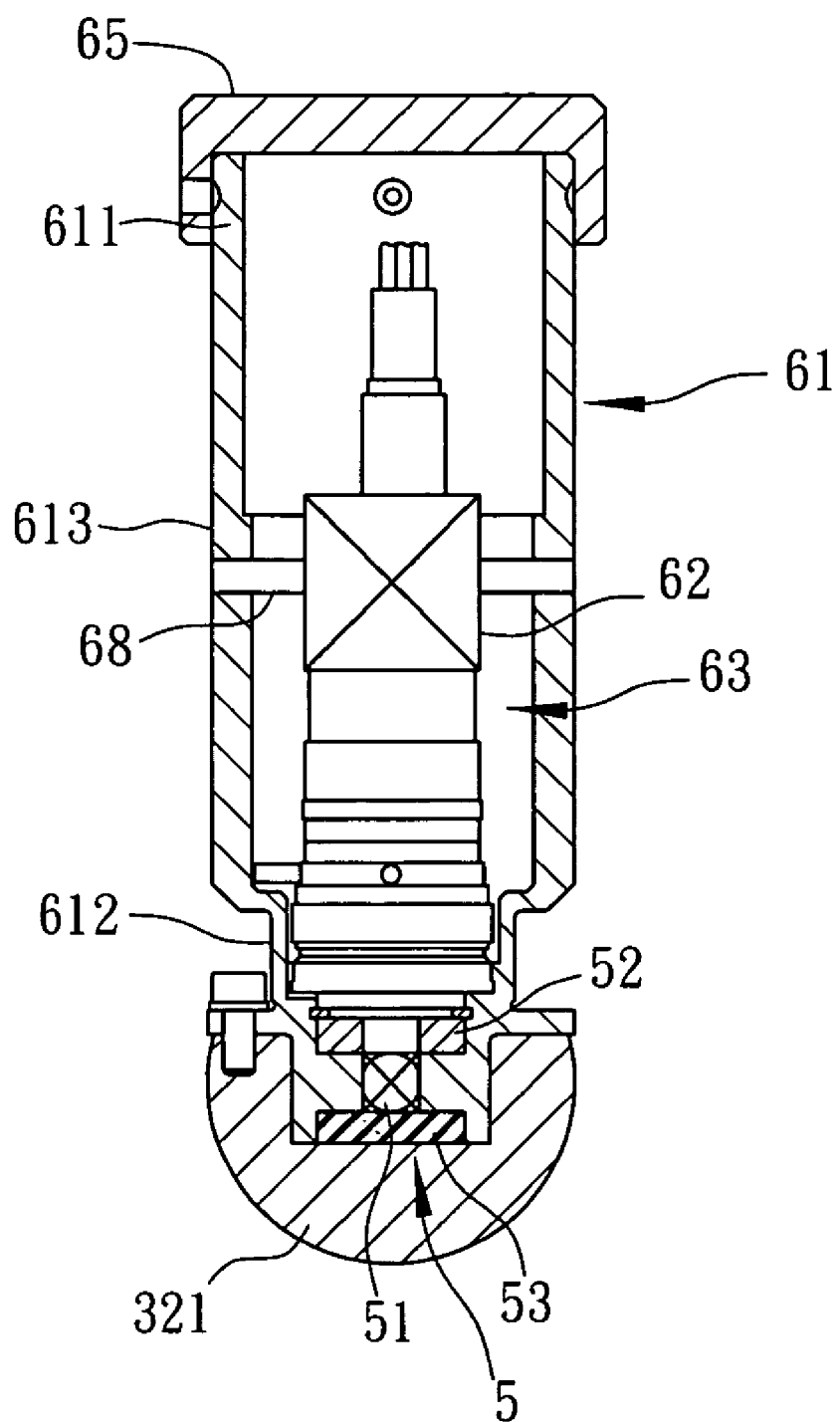
FIG. 3 is a sectional view of a portion of the preferred embodiment according to this invention.

Referring to FIG. 2, the preferred embodiment of an apparatus for observing the interior of a blast furnace 4 according to the present invention is shown to comprise a visible light guiding unit 3, a beam splitter unit 5, and a video camera system 6. The blast furnace 4 includes a furnace wall body 40 surrounding an upright axis, an internal hot furnace 42 which is disposed in and which is surrounded by the furnace wall body 40, a tuyere 43 disposed to extend through the furnace wall body 40 into the internal hot furnace 42 along a viewing axis (L) which is radial to the upright axis, and a furnace blowpipe 44 which is disposed outwardly of the furnace wall body 40, which is in fluid communication with the tuyere 43, and which has a peephole 41 extending along the viewing axis (L).

The visible light guiding unit 3 is elongated along the viewing axis (L), and includes a cantilevered stage 321, front and rear walls 322, 323, and a coupling sleeve 324 that are integrally formed as a single-piece structure 32, and a tubular mount 31 having front and rear tubular connectors 311, 312.

The front tubular connector 311 has a front outer threaded end 315 that is adapted to be threadedly engaged with the furnace blowpipe 44 so as to serve as a furnace-side end, and a front inner threaded end 313 that is opposite to the front outer threaded end 315 along the viewing axis (L). The rear tubular connector 312 has a rear outer threaded end 316 that is threadedly engaged with the front inner threaded end 313, and a rear tubular end 317 that is opposite to the rear outer threaded end 316 so as to serve as the viewing-side end. The front and rear tubular connectors 311, 312 respectively have inner tubular wall surfaces which are aligned with each other to respectively define proximate and distal segments of a light path 314. Hence, the light path 314 extends into the furnace blowpipe 44 along the viewing axis (L) so as to be in visual communication with the tuyere 43 through the peephole 41.

The apparatus according to this invention further comprises a brightness reducing window unit 7 including a filter 71 and a transparent mica sheet 72 which are disposed forwardly of the rear outer threaded end 316, and which are brought to abut against the front tubular connector 311 by virtue of threaded engagement between the rear outer threaded end 316 and the front inner threaded end 313.

The coupling sleeve 324 has a tubular anchoring portion 325 fittingly sleeved on the rear tubular end 317, and a tubular shielding portion 326 that is opposite to the tubular anchoring portion 325 along the viewing axis (L) and that engages and suspends the cantilevered stage 321 below the light path 314. The front and rear walls 322,323 extend uprightly from the cantilevered stage 321 and terminate respectively at front and rear rest ends 325, 327. The front and rear walls 322, 323 are spaced apart from each other along the viewing axis (L) to define an accommodation space 328 therebetween, and respectively have passage and peeping holes 320, 329 that extend respectively therethrough along the viewing axis (L), and that are aligned with the light path 314 so as to permit the light path 314 to extend across the accommodation space 328.

The beam splitter unit 5 is disposed in the accommodation space 328, and includes a beam splitter 51, a positioning member 52, and an elastomeric shock absorbing member 53. A beam of light propagating from the tuyere 43 along the light path 314 and incident on the beam splitter 51 is split into a horizontal component which continues to pass through the peeping hole 41, and a vertical component which is directed to propagate along an upright light route (X) that is perpendicular to the light path 314. The positioning member 52 and the elastomeric shock absorbing member 53 are disposed at opposite sides of the light path 314 in the accommodation space 328, and cooperatively hold the beam splitter 51 in position, thereby ensuring that the horizontal and vertical components of the light beam respectively travel along the light path 314 and the upright light route (X).

The video camera system 6 is disposed to capture a light image from the vertical component of the light beam, and includes an elongate casing 61 and a video camera 62.

The casing 61 includes upper and lower end walls 611, 612 opposite to each other along a centerline in the upright direction, and a barrel wall 613 interposed between the upper and lower end walls 611, 612 to define a cooling chamber 63. The lower end wall 612 has a peripheral abutment surface 614 which abuts against the front and rear rest ends 325, 327 in the upright direction and which defines an engaging opening 64 that is communicated with the cooling chamber 63 such that the centerline is in line with the upright light route (X), i.e., the vertical component of the light beam. The lower end wall 612 further has front and rear lugs 615, 616 which extend from the peripheral abutment surface 614 to the cantilevered stage 321 so as to rest thereon, and which respectively have through holes 617, 618 that are aligned with the light path 314. The casing 61 further includes a cover 65 which is disposed on the upper end wall 611 to cover the cooling chamber 63, and which has an inlet 651 for introduction of cool air from a cool air supply 66 into the cooling chamber 63, and a suspending member 67 which is disposed on the cover 65 to permit suspension of the casing 61.

The video camera 62 includes a camera body 621 disposed in the cooling chamber 63, and a head portion 622 disposed forwardly of the camera body 621. The head portion 622 is fitted in the engaging opening 64 so as to seal the cooling chamber 63, and extends outwardly of the engaging opening 64 along the centerline so as to capture the light image from the vertical component of the light beam.

The casing 61 further includes a retaining member 68 which is threadedly secured to the barrel wall 613 to retain the camera body 621 in the cooling chamber 63.

Some of the advantages of the apparatus according to this invention are:

1. By virtue of the provision of the beam splitter 51, the light beam from the internal hot furnace 42 can be split into a horizontal component that passes through the peeping hole 329 so as to enable the operator to observe the condition in the hot furnace 42, and a vertical component that is detected by the video camera 62 so that images of the interior of the hot furnace 42 can be provided to the operator. In addition, with the arrangement of the brightness reducing window unit 7, the operator can observe the interior of the hot furnace 42 without wearing goggles.

2. Since the casing 61 is elongated in the upright direction, and due to the weight of the video camera 62, the head portion 622 of the video camera 62 can be positioned precisely and steadily in the engaging opening 64 for capturing the light image from the vertical component of the light beam. In addition, the beam splitter 51 is securely retained by the positioning member 52 and the shock absorbing member 53, thereby preventing displacement and breakage of the beam splitter 51. Furthermore, by introducing cool air from the cool air supply 66 into the cooling chamber 63, the video camera 62 can be kept in a cool condition, thereby prolonging the service life thereof.

3. Since the casing 61 is detachably mounted on the single-piece structure 32, and due to detachable engagement between the front and rear tubular connectors 311, 312, and between the rear tubular connector 312 and the single-piece structure 32, maintenance of the apparatus is convenient. In addition, with the provision of the suspending member 67, the apparatus according to this invention can be suspended in place for convenient maintenance of the apparatus and the blast furnace 4.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. An apparatus for observing interior of a blast furnace system, the blast furnace system including a furnace wall body which surrounds an upright axis, an internal hot furnace which is disposed in and which is surrounded by the furnace wall body, a tuyere disposed to extend through the furnace wall body into the internal hot furnace along a viewing axis which is radial to the upright axis, and a furnace blowpipe which is disposed outwardly of the furnace wall body and which is in fluid communication with the tuyere, said apparatus comprising:

a visible light guiding unit elongated along the viewing axis, and including
a tubular mount which has furnace-side and viewing-side ends opposite to each other along the viewing axis, and an inner tubular wall surface that extends through said furnace-side and viewing-side ends to define a light path, said furnace-side end being secured to the furnace blowpipe such that the light path extends into the furnace blowpipe along the viewing axis to be in visual communication with the tuyere, a cantilevered stage disposed rearwardly of said viewing-side and below the light path, and front and rear walls which extend uprightly from said cantilevered stage to respectively terminate at front and rear rest ends, and which are spaced apart from each other along the viewing axis to define an accommodation space therebetween, said front and rear walls respectively having passage and peeping holes that extend therethrough and that are aligned with the light path so as to permit the light path to extend across said accommodation space;

a beam splitter disposed in said accommodation space such that a beam of light propagating from the tuyere along the light path and incident on said beam splitter is split into a horizontal component which passes through said peeping hole, and a vertical component which is directed to propagate along an upright light route that is perpendicular to the light path; and a video camera system disposed to capture a light image from the vertical component of the light beam, and including an elongate casing which includes upper and lower end walls opposite to each other along a centerline in the upright direction, and a barrel wall interposed between said upper and lower end walls to define a cooling chamber, said lower end wall being engaged with said front and rear rest ends such that the centerline is in line with the upright light route, and a video camera including a camera body which is disposed in said cooling chamber, and a head portion which is disposed forwardly of said camera body along the centerline so as to capture the light image from the vertical component of the light beam.

2. The apparatus according to claim 1, wherein said lower end wall of said casing has a peripheral abutment surface which abuts against said front and rear rest ends in the upright direction and which defines an engaging opening that is communicated with the cooling chamber, said head portion of said video camera being configured to be fitted in said engaging opening so as to seal said cooling chamber, and extending outwardly of said engaging opening.

3. The apparatus according to claim 2, wherein said lower end wall of said casing has front and rear lugs which extend from said peripheral abutment surface to said cantilevered stage so as to rest thereon, and which respectively have through holes that are aligned with the light path.

4. The apparatus according to claim 3, further comprising a positioning member and an elastomeric shock absorbing member which are at opposite sides of the light path in said accommodation space, and which cooperatively hold said beam splitter in position, thereby ensuring that the horizontal and vertical components of the light beam respectively travel along the light path and the upright light route.

5. The apparatus according to claim 3, wherein said cantilevered stage is integrally formed with said front and rear walls as a single-piece structure that is detachably connected to said tubular mount.

6. The apparatus according to claim 5, further comprising a brightness reducing window unit which is disposed downstream of said furnace-side end and upstream of said viewing-side end.

7. The apparatus according to claim 6, wherein said tubular mount includes a front tubular connector which defines a proximate segment of the light path, and which has a front outer threaded end that is adapted to be threadedly engaged with the furnace blowpipe so as to serve as said furnace-side end, and a front inner threaded end that is opposite to said front outer threaded end along the viewing axis, and a rear tubular connector which defines a distal segment of the light path, and which has a rear outer threaded end that is threadedly engaged with front inner threaded end so as to bring said proximate segment into alignment with said distal segment, and a rear tubular end that is opposite to said rear outer threaded end so as to serve as said viewing-side end;

said brightness reducing window unit including a filter and a mica sheet which are disposed forwardly of said rear outer threaded end, and which is brought to abut against said front tubular connector by virtue of threaded engagement between said rear outer threaded end and said front inner threaded end.

8. The apparatus according to claim 7, wherein said visible light guiding unit further includes a coupling sleeve which has a tubular anchoring portion fittingly sleeved on said rear tubular end, and a tubular shielding portion that is opposite to said tubular anchoring portion along the viewing axis and that is configured to suspend said cantilevered stage below the light path.

9. The apparatus according to claim 8, wherein said coupling sleeve is integrally formed with said cantilevered stage in the single-piece structure.

10. The apparatus according to claim 1, wherein said casing includes a cover which is disposed on said upper end wall to cover said cooling chamber, and which has an inlet for introduction of cool air into said cooling chamber, and a suspending member which is disposed on said cover to permit suspension of said casing.

11. The apparatus according to claim 10, wherein said casing includes a retaining member which is disposed on said barrel wall to retain said camera body in said cooling chamber.

* * * * *